United States Patent
Daniel et al.

(10) Patent No.: US 10,872,424 B2
(45) Date of Patent: Dec. 22, 2020

(54) OBJECT TRACKING USING OBJECT ATTRIBUTES

(71) Applicant: Accenture Global Solutions Limited, Dublin (IE)

(72) Inventors: Philippe Daniel, Singapore (SG); Anders Astrom, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 131 days.

(21) Appl. No.: 16/195,285

(22) Filed: Nov. 19, 2018

(65) Prior Publication Data
US 2020/0160538 A1    May 21, 2020

(51) Int. Cl.
G06T 7/246    (2017.01)

(52) U.S. Cl.
CPC .................................... *G06T 7/248* (2017.01)

(58) Field of Classification Search
None
See application file for complete search history.

(56) References Cited

U.S. PATENT DOCUMENTS

| 8,224,029 | B2 | 7/2012 | Saptharishi et al. | |
| 8,879,786 | B2 | 11/2014 | Yu et al. | |
| 10,235,762 | B1 * | 3/2019 | Wylie | G06T 7/292 |
| 2007/0092110 | A1 | 4/2007 | Xu et al. | |
| 2008/0166045 | A1 | 7/2008 | Xu et al. | |
| 2008/0273752 | A1 * | 11/2008 | Zhu | G08G 1/167 |
| | | | | 382/103 |
| 2011/0279685 | A1 * | 11/2011 | Alahi | H04N 5/247 |
| | | | | 348/187 |
| 2015/0146917 | A1 * | 5/2015 | Bernal | G06K 9/00771 |
| | | | | 382/103 |
| 2016/0070988 | A1 * | 3/2016 | Romanenko | G06K 9/3241 |
| | | | | 382/159 |
| 2018/0068448 | A1 * | 3/2018 | Rastgar | G06K 9/00664 |
| 2018/0107880 | A1 * | 4/2018 | Danielsson | G06K 9/00268 |

(Continued)

OTHER PUBLICATIONS

Evaluation of multi feature fusion at score-level for appearance-based person reidentification, 2015 (Year: 2015).*

(Continued)

*Primary Examiner* — Iman K Kholdebarin
(74) *Attorney, Agent, or Firm* — Fish & Richardson P.C.

(57) ABSTRACT

Methods, systems, and apparatus, including computer programs encoded on computer storage media, for tracking objects over a sequence of images. In one aspect, a process includes receiving data specifying visual attributes of a particular object detected in an image. Data specifying visual attributes of a tracked object is identified. A level of similarity is determined between the particular object and the tracked object based on comparison of visual attributes of the particular object with corresponding visual attributes of the tracked object. A first normalization function is used to normalize a level of similarity between first corresponding visual attributes of the particular object and the tracked object. A second normalization function is used to normalize a level of similarity between second corresponding visual attributes of the particular object and the tracked object. A determination is made, based on the level of similarity, whether the particular object matches the tracked object.

20 Claims, 5 Drawing Sheets

(56) References Cited

U.S. PATENT DOCUMENTS

2019/0066313 A1\* 2/2019 Kim .................... G06K 9/4628
2020/0160538 A1\* 5/2020 Daniel ................... G06T 7/246

OTHER PUBLICATIONS

APFel: The intelligent video analysis and surveillance system for assisting human operators, 2013 (Year: 2013).\*
EP Search Report in European Application No. 19204153, dated Jan. 31, 2020, 9 pages.
Eisenbach et al "Evaluation of multi feature fusion at score-level for appearance-based person re-identification", 2015 International Joint Conference on Neural Networks, Jul. 12, 2015, pp. 1-8.
Kolarow et al., "APFel: The intelligent video analysis and surveillance systems for assisting human operators", 2013 $10^{th}$ IEE International Conference on Advanced Video and Signal Based Surveillance, Aug. 27, 2013, pp. 195-201.
Martinel et al., Person Reidentification in a Distributed Camera Network Framework, IEEE Transactions on Cybernetics, 47(11): 3530-35341, dated Nov. 1, 2017.
Martinel et al., "Temporal Model Adaptation for Person Re-identification", International Conference on Financial Cryptography and Data Security, Sep. 17, 2016, pp. 858-877.
Zheng et al., "Person Re-identification: Past, Present and Future", arxiv.org, Oct. 10, 2016, 20 pages.

\* cited by examiner

OBJECT TRACKING USING OBJECT ATTRIBUTES

BACKGROUND

Video analytics can be used to track the location of objects across frames of a video. Typically, the frames of the video are analyzed individually to identify objects in each frame. The location of the objects in sequential frames can then be used to track an individual object from one frame to the next.

SUMMARY

This specification generally describes systems, methods, devices, and other techniques for tracking objects over sequences of images using attributes of the objects.

In general, one innovative aspect of the subject matter described in this specification can be embodied in methods that include the actions of receiving, by a computing system, data specifying visual attributes of a particular object detected in an image of a sequence of images. The computing system can obtain a tracked object profile for each tracked object in a set of tracked objects that have been previously detected in the sequence of images. The tracked object profile for each tracked object can specify (i) visual attributes of the tracked object and (ii) a tracked object identifier for the tracked object. The computing system can determine that the particular object that was detected in the image is a same object as a particular tracked object in the set of tracked objects that was previously detected in the sequence of images. The determining can include, for one or more tracked objects in the set of tracked objects, determining, for each of one or more visual attributes of the tracked object specified by the tracked object profile for the tracked object, a similarity score that represents a measure of similarity between the visual attribute of the tracked object and a corresponding visual attribute of the particular object. The determining can also include normalizing the similarity score for each of the one or more visual attributes of the tracked object using a normalization function for the visual attribute. The normalization function for at least one visual attribute can be different from the normalization function for at least one different visual attribute. The computing system can determine an overall similarity score for the tracked object based on each normalized similarity score for each of the one or more visual attributes of the tracked object. The overall similarity score can represent an overall measure of visual similarity between the tracked object and the particular object. The computing system can determine, based on the overall similarity score for each of the one or more tracked objects including the particular tracked object, that the particular object is the same object as the particular tracked object. In response to determining that the particular object is the same object as the particular tracked object, the computing system can associate the tracked object identifier for the particular tracked object with the particular object in the image of the sequence of images. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some aspects, associating the tracked object identifier for the particular tracked object with the particular object in the image of the sequence of images can include storing, with the image, data specifying the tracked object identifier and a location of the particular object in the image.

In some aspects, determining the overall similarity score for the tracked object based on the combination of the normalized similarity score for each visual attribute of the tracked object can include determining a sum of a baseline score and the normalized similarity score for each visual attribute of the tracked object. The baseline score can be based on a number of objects detected in the image.

In some aspects, determining, for each visual attribute of the tracked object specified by the tracked object profile for the tracked object, the similarity score that represents a measure of similarity between the visual attribute of the tracked object and the corresponding visual attribute of the particular object can include, for each visual attribute of the tracked object, providing the visual attribute of the tracked object and the corresponding visual attribute of the particular object as input to a dedicated attribute model for a type of attribute of the visual attribute of the tracked object. The attribute model for each type of attribute can be different from the attribute model for each other type of attribute. Determining the similarity score can also include receiving, as an output of the dedicated attribute model, the similarity score that represents the measure of similarity between the visual attribute of the tracked object and the corresponding visual attribute of the particular object.

In some aspects, the one or more visual attributes of the tracked object include multiple visual attributes. Determining an overall similarity score for the tracked object based on each normalized similarity score for each of the one or more visual attributes of the tracked object can include determining, as the overall similarity score, a combination of the normalized similarity scores for the multiple visual attributes.

In some aspects, the normalization function for each visual attribute is based on an assigned distinctiveness of the visual attribute.

In some aspects, each normalization function for each visual attribute specifies a range of values for the normalized similarity score determined using the normalization function. The range of values of one or more of the normalization functions can include a negative subrange that include one or more negative values and a positive subrange that includes one or more positive values. Each subrange can be based on a first measure of likelihood that two objects for which the visual attribute matches are a same object and a second measure of likelihood that two objects for which the visual attribute does not match are not the same object.

In some aspects, the sequence of images is part of a video. The computing system can determine that a given tracked object in the set of tracked objects has not been detected in at least a threshold duration of the video since a last image in which the given tracked object was detected and, in response, remove the given tracked object from the set of tracked objects.

In some aspects, the sequence of images includes images captured by multiple cameras. The attributes of the particular object can include an attribute specifying a camera of the multiple cameras that captured the image. The tracked object profile for each tracked object can include data specifying one or more cameras that captured an image in which the tracked object was detected and, for each camera, one or more times the tracked object was detected in an image captured by the camera.

Some aspects can include updating the tracked object profile for the particular tracked object in response to determining that the particular object is the same object as the particular tracked object. The updating can include updating the visual attributes of the particular tracked object based on the visual attributes of the particular tracked object. Updating the visual attributes of the particular tracked object based on the visual attributes of the particular tracked object can include determining a combined visual attribute for at least one visual attribute of the particular tracked object by combining the visual attribute of the particular tracked object with the corresponding visual attribute of the particular object.

In general, another aspect of the subject matter described in this specification can be embodied in methods that include the actions of receiving, by a computing system, data specifying visual attributes of a particular object detected in an image. The computing system can identify data specifying visual attributes of a tracked object. The computing system can determine a level of similarity between the particular object detected in the image and the tracked object based on comparison of visual attributes of the particular object with corresponding visual attributes of the tracked object, including normalizing similarities for the compared visual attributes. A first normalization function used to normalize a level of similarity between first corresponding visual attributes of the particular object and the tracked object can be different from a second normalization function used to normalize a level of similarity between second corresponding visual attributes of the particular object and the tracked object. The computing system can determine, based on the level of similarity between the particular object detected in the image and the tracked object, whether the particular object matches the tracked object. The computing system can provide an indication of whether the particular object matches the tracked object. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In some aspects, determining a level of similarity between the particular object detected in the image and the tracked object can include determining, as the level of similarity, a combination of the normalized similarities for the visual attributes.

In some aspects, the first normalization function is based on an assigned distinctiveness of the first corresponding visual attributes and the second normalization function is based on an assigned distinctiveness of the second corresponding visual attributes.

In some aspects, each normalization function for each visual attribute specifies a range of values for a normalized similarity determined using the normalization function. The range of values of one or more of the normalization functions includes a negative subrange that include one or more negative values and a positive subrange that includes one or more positive values. Each subrange can be based on a first measure of likelihood that two objects for which the visual attribute matches are a same object and a second measure of likelihood that two objects for which the visual attribute does not match are not the same object.

The subject matter described in this specification can be implemented in particular embodiments and may result in one or more of the following advantages. Using visual attributes of objects detected in a sequence of images, e.g., in one or more videos or image streams, to determine whether objects are visually similar allows for more accurate object tracking relative to object tracking techniques that do not use the visual attributes. The use of visual attributes also allows for the tracking of objects over sequences of images even if the object becomes obscured by another object such that the tracked object is not visible in some of the frames or if the object overlaps with another object in some of the frames. The use of visual attributes also enables objects to be tracked over sequences of images received from multiple cameras as the visual attributes can be used to match the object in images from one camera with images of the object from another camera.

An object tracking system can use different functions, e.g., different normalization functions, for different visual attributes or different types of visual attributes such that normalized similarity scores for the various attributes more accurately reflect the attributes' contribution to the overall similarity assessment between two objects. For example, some visual attributes, e.g., color, are strong indicators that two objects are the same if that visual attribute of the two objects do not match, but are weak indicators that two objects are the same if that visual attribute of the two objects match. For example, it is not uncommon for distinct objects to have the same color, and thus an indication that two objects have the same color may contribute relatively little to a positive similarity assessment (i.e., the same color may indicate a possibility that two objects are the same but is not definitive due to possible presence of other objects having the same color) but an indication that two objects have different colors may contribute substantially to a negative similarity assessment (i.e., highly unlikely that the two objects having different colors are in fact the same object). Similarly, some visual attributes, e.g., a person's pose, are indicators that two objects are the same if that visual attribute of the two objects do match, but are weak indicators that two objects are not the same if that visual attribute of the two objects do not match. For example, a person's pose can change from frame to frame if the person is moving. By accounting for these differences using different normalization functions, the object tracking system can more accurately determine that two objects in different frames are the same and more accurately track the objects over multiple frames.

Using visual attributes of objects detected in a sequence of images to determine whether objects are visually similar also improves the tracking efficiency and accuracy. For example, storing and comparing data specifying attributes of objects requires less data storage requirements than storing the actual images and requires fewer operations that attempting to compare the raw images themselves. In addition, comparing data specifying attributes of objects to determine whether two objects are the same can be completed much quicker than comparing images, resulting in faster object tracking that can be used in real time video streams.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, systems, devices, and computer readable medium for using attributes of objects to track objects over a sequence of images. The sequence of images can include one or more videos or one or streams of images. A frame of a video is also referred to as an image in this document. An object tracking system can determine whether an object detected in a current image is the same object as a tracked object detected in one or more previous images in the sequence based on attributes of the detected object and attributes of the tracked object. The attributes can include various attributes such as the location of the object in the image, the color(s) of the object, patterns of the object, text content, physical size, and other visual attributes as described below.

Figure 1:
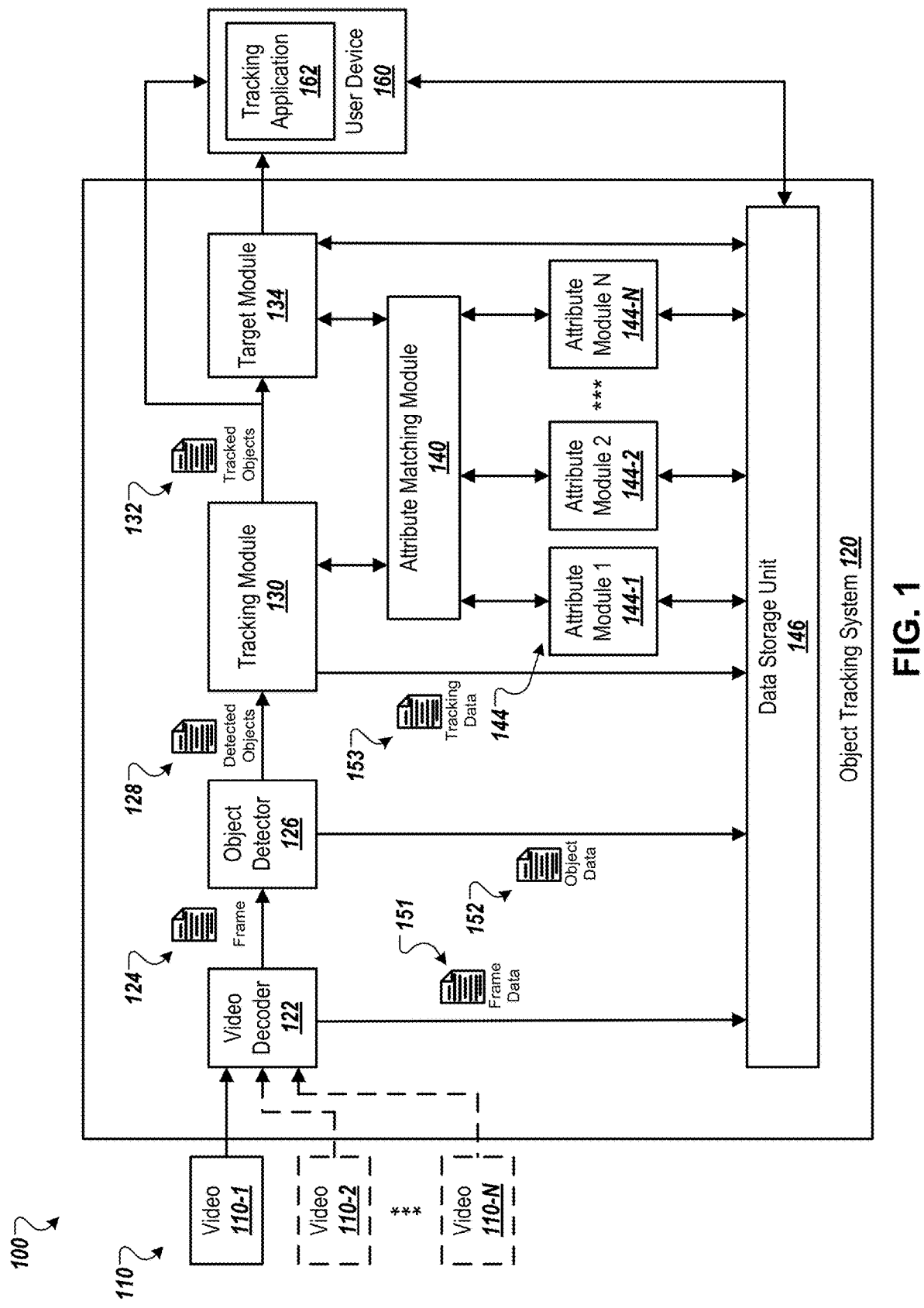
FIG. 1 is an example of an environment in which an object tracking system tracks objects in sequences of images.

FIG. 1 is an example of an environment 100 in which an object tracking system 120 tracks objects in sequences of images. The object tracking system 120 includes a video decoder 122 that receives one or more videos 110-1-110-N. The videos 110-1-110-N can include video files or video streams. For example, the video decoder 122 can receive each video 110-1-110-N from a video camera, a video streaming service, or a data storage system that stores video files. In another example, a sequence of still images is received from one or more still cameras.

The video decoder 122, which can include a frame sampler, decodes compressed video files or video streams into individual frames of images. For example, the video decoder 122 can include an MPEG, H.264, DIVX, or other suitable decoder. The video decoder 122 can generate image frame data 151 for each image. The image frame data 151 for an image can include, for example, the image itself (or image data, such a pixel data, that represents the image), a frame key that uniquely identifies the image and optionally the video itself, a frame number that represents the numbered frame of the video, and/or a time stamp. The time stamp for a video for a frame of a video file can indicate a time at which the image is presented in the video, e.g., at five minutes and thirty seconds from the beginning. The time stamp for a video stream can indicate a time at which the frame was received by the decoder.

The image frame data 151 for an image can also include, if available, a camera name or identifier that identifies the camera from which the video was received, geographic location data specifying the location of the camera or the location in the field of view of the camera, pan/tilt/zoom settings of the camera, and/or other appropriate data. This data can be particularly useful for cameras that are not fixed as these settings can change over time.

The video decoder 122 can provide the image frame data 151 for each frame of the video to a data storage unit 146. The data storage unit 146 is the main data storage location for images, image frame data 151, object detection data, and tracking data. The data storage unit 146 can include a buffer, database, or other form of storage that allows for the storage of records/objects that are accessible (e.g., indexed) using keys. The data storage unit 146 can also include flash memory, hard drives, or other forms of persistent data storage.

The video decoder 122 also provides each image 124 and optionally the image frame data 151 for the image to an object detector 126. The object detector 126 detects the presence of objects in the images received from the video decoder 122. The object detector 126 can also determine the class of a detected object, e.g., person, car, bicycle, truck, and so on. In some implementations, the object detector 126 is stateless in the sense that each image is analyzed independently from each other. In some implementations, the object detector 126 is a deep learning neural network model-based object detector that has been trained on sample data for a particular use case (e.g., person detection for security monitoring). Some example object detectors include the You Only Look Once (YOLO) object detector, the Faster R-CNN object detector, and the Single Shot Multibox Detector (SSD) object detector. The object tracking system 120 can include multiple object detectors 126 that recognize objects in images in parallel to increase the speed at which the images of the video(s) are analyzed for object detection.

The object detector 126 can create an object data detection record 152 for each detected object and provide the object data detection record 152 to the data storage unit 146 for storage. The object data detection record 152 for a detected object can include a detection key that uniquely identifies the detected object, the frame key for the image in which the object was detected, the location of the object in the image, an object class for the detected object, a detection confidence score for the detected object, and/or other appropriate data for the detected object. The location of the object in the image can include bounding box data or data for another data structure (e.g., a polygon or mask) that represents the location of the object in the image. The object class for the object can indicate the class of the object, e.g., a person, car, building, etc. The detection confidence score can represent the confidence that the object detector 126 has that a bounding box or other structure contains an object.

The object detector 126 can send detected object data 128 for each detected object to a tracking module 130. The detected object data 128 for each detected object can include the same data at the object data detection record 152 for the detected object. The object detector 126 can also provide, to the tracking module 130 the image in which the object was detected. In another example, the tracking module 130 can obtain the image from the data storage unit 146, e.g., using the frame key in the detected object data 128 for the detected object.

In general, the tracking module 130 orchestrates the tracking of detected objects. The tracking module 130 can assign a unique tracked object identifier to each detected object for which detected object data 128 is received from the object detector 126, maintain a cache of recently detected objects, interact with an attribute matching module 140 to determine the similarity between detected objects, and determine whether two detected objects in different images are the same object based on the determined similarity.

The tracking module 130 can maintain a cache, e.g., temporary memory or a temporary log or list, of tracked objects that have been detected in one or more images of a particular video or a particular set of videos. In some implementations, the cache, which may be part of the data storage unit 146, includes a tracked object profile for each tracked object in the cache. The tracked object profile for each tracked object can include the unique tracking identifier for the tracked object and data specifying attributes of the tracked object. The attributes of a tracked object can be determined by attribute modules 144-1-144-N, as described below.

The attributes can include visual attributes that can be extracted from the image or determined using image analysis, such as the color(s) of the object (e.g., a color profile for the object), patterns of the object, text content of the object, the physical size of the object, a make and/or model of a car, clothes being worn on a person, accessories worn by a person, a hair style or hair color of a person, facial features of a person, the pose of a person, and/or other appropriate visual attributes. The attributes can also include other attributes, such as the geographic location of the object, e.g., as determined by the location of the camera, the direction of the camera, a timestamp that indicates the time at which the object was detected, etc. The attributes can vary for different types of objects, e.g., the tracked object profile for a person can have different attributes (e.g., clothes attributes) than the tracked object profile for a car (e.g., make and model of the car).

In implementations in which images are decoded from multiple cameras, the tracked object profile for a tracked object can also include the name or identifier for each camera that provided video (or an image) that includes the object and a timestamp indicating for one or more times that the object was detected in an image from the camera. Using this information along with the location of the camera and the pan/tilt/zoom settings of the cameras, the tracking module 130 can determine whether an object detected in images from two or more cameras are the same object. For example, if the objects are detected in two cameras that are near each other over a short period of time, it is more likely that the objects are the same than if the objects are detected in two cameras that are further away from each other.

The tracking module 130 can maintain the cache of zero or more tracked objects such that only recently detected objects are included in the cache. For example, the tracking module 130 can include in the tracked object profile for each object a time stamp that indicates a last time that the tracked object was detected in an image in the sequence of images. The tracking module 130 can determine whether a tracked object has been detected in an image for at least a threshold duration of time (e.g., two minutes, five minutes, twenty minutes, or another appropriate duration). If not, the tracking module 130 can remove the tracked object from the cache. This frees up memory space for other data and reduces the number of tracked objects any newly detected objects are compared to, which can speed up the comparison process and reduce the amount of resources used in the comparison process.

In another example, the tracking module 130 can maintain the cache based on the number of frames of a video since a tracked object was last detected. For example, the number of frames can be one frame, five frames, twenty frames, or another appropriate number of frames.

When detected object data 128 is received for an image, the tracking module 130 can query an attribute matching module 140 for the similarity between each detected object and each tracked object in the cache of tracked objects. For example, the tracking module 130 can provide the image of the detected object and the tracked object profile for each tracked object in the cache to the attribute matching module 140. In another example, the tracking module 130 can provide, to the attribute matching module 140, the detection key for the detected object, the frame key for the image in which the detected object was detected, and the tracked object identifier for each tracked object in the cache. The attribute matching module 140 can use this data to retrieve the image in which the detected object was detected and the attributes for each tracked object in the cache.

The attribute matching module 140 can then determine, for each detected object, an overall similarity score for one or more of the tracked objects. The overall similarity score for a detected object and a tracked object can represent a measure of similarity between the detected object and the tracked object. For example, a higher overall similarity score can indicate that the detected object is more similar to a tracked object and a lower overall similarity score can indicate that the detected object is less similar to the tracked object.

The attribute matching module 140 can determine the overall similarity score for a detected object and a tracked object based on the similarity between one or more attributes of the objects. The attribute matching module 140 can interact with a set of attribute modules 144-1-144-N to determine the similarity between attributes. In general, each attribute module 144-1-144-N can determine the similarity between attributes of a particular type. For example, the attribute module 144-1 may determine the similarity between color profiles of two objects while the attribute module 144-2 may determine the similarity between clothes worn by two people.

In some implementations, the object tracking system 120 includes an attribute module 144 for each type of attribute included in the tracked object profile of each tracked object. In this way, a user (e.g., system designer) can add, modify, or remove attributes that are used in determining whether objects are similar, e.g., for different use cases. This makes the object tracking system 120 flexible for various use cases and for adapting to changing conditions.

Each attribute module 144 can extract its attribute from an image that depicts a detected object. For example, the attribute module 140 for color profiles can extract color(s) of the object and generate a color profile for the detected object. The color profile can be in the form of a feature vector that includes color values for the detected object. The attribute module 144 can then append the extracted data to the object data detection record 152 for the detected object. In this way, the object data detection record 152 can include the attributes for the detected object and can be used to generate the tracked object profile for the detected object, e.g., if it is determined that the detected object is not the same object as one of the tracked objects in the cache.

One or more of the attribute modules 144 can use second level analytics to extract attributes of objects from an image after the object has been detected and classified into an appropriate class. For example, after determining that an object in an image is a person, an attribute module 144 for extracting attributes for a person can identify different articles of clothes or accessories being worn by the person based on the knowledge that the object is a person. In a particular example, by knowing that the object is a person and the orientation of the person in the image, the attribute module 144 can identify the location of clothes being worn by the person and classify the clothes and/or extract attributes of the clothes.

Each attribute module 144 can determine the similarity between the extracted attribute and the corresponding attribute of one or more tracked objects. For example, the attribute module 144 can determine a similarity score that represents a measure of similarity between the attribute of the detected object and the corresponding attribute of the tracked object. The determination of these similarity scores can vary based on the type of attribute. For example, the attribute module 144 for color profiles can determine the similarity score between two features vectors that represent the color profiles of two objects using cosine similarity techniques. The attribute module 144 for make and model of car can determine the similarity between two cars by determining the make and model of each car and comparing the make and model of each car. If the make does not match, the similarity score may be low, whereas if the make and model match, the similarity score may be high. If the make matches, but the model does not but the models are similar (e.g., a midsize sedan and a full size sedan).

One or more of the attribute modules 144 can also merge the attributes of two or more objects, e.g., of a detected object and a tracked object that is determined to be the same object as the detected object. For example, if the tracking module 130 determines that the detected object is the same object as one of the tracked objects, the tracking module 130 can query the attribute matching module 140 to merge the attributes of the detected object with the tracked object. The attribute matching module 140 can then query the appropriate attribute modules 144 to merge the attributes of the objects that can be merged. For example, colors can merge via averaging pixel values for the colors, e.g., if a person's shirt is a bright red in one image due to a change in lighting.

To determine the overall similarity score for a detected object and a tracked object, the attribute matching module 140 can identify one or more attribute modules 144 based on the attributes of the detected object and/or the attributes of the tracked object. For example, if the objects do not include a particular type of attribute, the attribute matching module 140 does not need to query the attribute module 144 for that type of attribute. The attribute matching module 140 can then send the image of the detected object and the appropriate attributes of the tracked object to each identified attribute module 144. For example, the attribute matching module 140 can send the image of the detected object and the color profile of the tracked object to the attribute module 144 that determines the similarity between color profiles.

Each identified attribute module 144 can extract the corresponding attribute from the image can determine a similarity score for the attribute of the detected object extracted from the image and the corresponding attribute of the tracked object. For example, the attribute module 144 for color profile can extract the color(s) of the detected object from the image and determine a similarity score that represents a measure of the similarity between the color profile of the detected object and the color profile of the tracked object. Each identified attribute module 144 can provide its determined similarity score to the attribute matching module 140.

The attribute matching module 140 can determine the overall similarity score for the detected object and the tracked object based on a combination of the one or more similarity scores received from the attribute modules for these two objects. In some implementations, the overall similarity score for the detected object and the tracked object is based on a sum of the similarity scores received from the identified attribute modules 144. For example, the overall similarity score can be equal to a sum of the similarity scores and a baseline score. The baseline score can be a constant, e.g., zero. In some implementations, the baseline score is based on a number of detected objects in the image in which the detected object was detected. For example, the baseline score can be equal to one divided by the number of detected objects in the image.

In some implementations, the attribute matching module 140 can normalize one or more of the similarity scores before combining the scores. The similarity scores can be normalized using normalization functions. Each normalization function can normalize the similarity score to a normalized similarity score that is within a particular range, e.g., −5 to 5. In this example, a normalized similarity score for an attribute that is equal to zero can indicate that the similarity between the attributes of the two objects does not increase or decrease the probability that the detected object is the same object as the tracked object, as if nothing else was known. A normalized similarity score that is greater than zero can indicate that it is more likely that the detected object is the same object as the tracked object. The normalized similarity score can be weighted in a way such that it is a probability of $$\frac{1}{10^{normalized\ similairty\ score}}$$

that the detected object is not the same object as the tracked object assuming only information of this attribute is known. A normalized score that is less than zero can indicate that it is more likely that the detected object is not the same as the tracked object. The normalized similarity score can be weighted in a way such that it is a probability of $$\frac{1}{10^{normalized\ similairty\ score}}$$

that the detected object is the same object as the tracked object assuming only information of this attribute is known.

The normalization function can differ for different attributes or different attribute types. For example, the normalization function for the color profile can be different from the normalization function for a person's pose. The normalization function for an attribute can be based on the distinctiveness of the attribute. For example, color is a strong indicator that two objects are not the same if the color of the two objects do not match, but is a weak indicator that two objects are the same if the color of the two objects match as it is not uncommon for distinct objects to have the same color. Similarly, a person's pose is a strong indicator that two people are the same if they have matching poses, but is a weak indicator that two people are not the same if the poses do not match. For example, a person's pose can change from frame to frame if the person is moving. By accounting for these differences using different normalization functions, the attribute matching module 140 can more accurately determine that two objects in different images are the same.

The normalization functions can differ by having differing ranges of normalized values output by the normalization functions. For example, if the attribute is a strong indicator that two objects do not match when the attributes do not match, but a weak indicator that two objects do match when the attributes match, the range of normalized similarity scores output by the normalization function for the attribute can extend further into the negative range than in the positive range.

In a particular example, the range of normalized similarity scores for color profiles can be −3 for low similarity to 0.5 for high similarity. In this example, the output of the normalization function would be within the range of −3 to 0.5, inclusive, based on the input similarity score. If two objects have very different colors, e.g., dark blue vs. pink, the normalized similarity score for the color profile can be −3 to indicate that it is highly unlikely that the two objects are the same based on color profile alone. If two objects have exactly the same color, e.g., the same shade and brightness of red, the normalized similarity score for the color profile can be 0.5 to indicate that the objects are somewhat more likely to match based on their matching color profile. However, the magnitude of the normalized similarity score is lower for matching colors than the magnitude given to non-matching colors (0.5 vs. 3) because matching color is not as strong of an indicator that two objects match as the indicator that non-matching colors is an indicator that two objects do not match.

Similarly, the ranges of normalized similarity scores for a person's pose can be −1 for low similarity to 2.5 for high similarity. In this example, the output of the normalization function would be within the range of −1 to 2.5, inclusive, based on the input similarity score. If two objects have very different poses, e.g., one person jumping a hurdle and the other person in the savasana yoga pose, the normalized similarity score for the pose can be −1 to indicate that it is somewhat unlikely that the two people are the same based on pose alone. If two objects have exactly the same pose, e.g., both standing straight up and facing the camera, the normalized similarity score for the pose can be 2.5 to indicate that the objects are more likely to match based on their matching poses. In this example, the magnitude of the normalized similarity score for matching poses is higher than the magnitude given to non-matching poses (2.5 vs. 1) because matching poses is a stronger indicator that two objects match than the indicator is for two objects not matching based on non-matching poses.

The attribute matching module 140 can combine the normalized similarity scores in a similar manner as combining non-normalized similarity scores. For example, the attribute matching module 140 can determine the overall similarity score for a detected object and a tracked object by adding the normalized similarity scores together, optionally with a baseline score.

The attribute matching module 140 can determine an overall similarity score for each of one or more tracked objects with respect to the detected object. In some implementations, the attribute matching module 140 determines an overall similarity score for each tracked object in the cache of tracked objects. In some implementations, the attribute matching module 140 determines the overall similarity score for fewer than all of the tracked objects in the cache. The attribute matching module 140 can use the class of the detected object to identify tracked objects, if any, in the cache that are assigned the same class as the detected object. For example, if the detected object is a person, the attribute matching module 140 can determine a respective overall similarity score for the detected object and each tracked person in the cache of tracked object, without determining an overall similarity score for other classes of objects such as cars or buildings. This reduces the amount of wasted computing resources that would be used to determine similarity scores for tracked objects that are highly unlikely to match the detected object.

The attribute matching module 140 can provide the determined overall similarity scores for the detected object to the tracking module 130. The tracking module 130 can determine if the detected object is the same object as one of the tracked objects based on the overall similarity scores. In some implementations, the attribute matching module 140 can determine that the detected object is the same object as the tracked object if the overall similarity score for the detected object and the tracked object exceeds a threshold similarity score.

In some implementations, the tracking module 130 converts each overall similarity score into a probability that the objects are the same. For example, the tracking module 130 can convert the overall similarity scores to probabilities using a sigmoid function, offset by an estimate of the a-priori probability that any detected object is the same as any given tracked object before anything else is known about either the tracked object or the detected object. This a-priori probability can be equal to one divided by the number of detected objects detected in the image. The tracking module 130 can compare the probability for the detected object and a tracked object to a threshold probability. If the probability meets or exceeds the threshold probability, the tracking module 130 can determine that the detected object is the same object as the tracked object.

In some implementations, the tracking module 130 can rank the tracked objects for which an overall similarity score was determined and use the ranking to determine whether the detected object is the same object as a tracked object. The tracking module 130 can rank the tracked objects using the overall similarity scores, e.g., with the tracked object having the highest overall similarity score being assigned the highest ranking, the tracked object having the next highest overall similarity score being assigned the next highest ranking, and so on. If the overall similarity score for the highest ranked tracked object is less than or equal to a threshold similarity score, e.g., zero, the tracking module 130 can determine than the detected object is not the same object as a tracked object and assign the detected object a unique tracked object identifier. The tracking module 130 can also add the detected object to the cache of tracked objects as a tracked object and generate a tracked object profile for the detected object. The tracking module 130 can also store data indicating that the object in the image is the detected object, e.g., by storing the tracked object identifier in the image frame data 151 for the image.

If the highest ranked tracked object has already been determined to be the same object as the detected object, the tracking module 130 can instead consider the next highest ranked tracked object. If the overall similarity score for the highest ranked tracked object or another tracked object being considered is exceeds the threshold similarity score, the tracking module 130 can determine that the detected object is the same object as the tracked object. The tracking module 130 can then assign the tracked object identifier to the detected object. The tracking module 130 can also store data indicating that the object in the image is the tracked object, e.g., by storing the tracked object identifier in the image frame data 151 for the image.

As described above, the tracking module 130 can also merge attributes of the detected object with the tracked object if the detected object is determined to be the same object as the tracked object. The tracking module 130 can update the tracked object profile for the tracked object to include the merged attributes, e.g., in place of corresponding attributes previously included in the tracked object profiled for the tracked object.

In some implementations, the tracking module 130 only queries the attribute matching module to determine the overall similarity score for tracked objects in certain conditions. For example, if there is only one detected object in the image and only one tracked object that was detected in the previous frame and the objects are in the same location in both frames, the tracking module 130 can consider the detected object to be the tracked object as it is unlikely to be a different object. This can reduce the amount of computing resources used to determine whether a detected object is the same object as a tracked object and speed up the determination process.

In another example, the tracking module 130 can query the attribute matching module 140 to compare a single attribute of a detected object to the corresponding attribute of one or more tracked objects. This attribute may be a distinctive attribute such as location in the image or size of the object. If this attribute of the detected object has at least a threshold similarity score with respect to the corresponding attribute of a tracked object, the tracking module 130 can consider the two objects to be the same object without considering the other attributes. This also reduces the amount of computing resources used and the amount of time making the determination.

The object tracking system 120 also includes a target module 134. The target module 134 can perform similar operations as the tracking module 130. However, rather than maintain a cache of tracked objects and determine whether detected objects are the same as tracked objects, the target module 134 can maintain a cache, e.g., temporary log or list, of target objects and determine whether any tracked objects or detected objects are the same as the target objects.

The target objects can include objects of interest, e.g., people or cars of interest. As the target objects are objects of interest, the target objects can be added to or removed from the cache based on whether they are of interest rather than based on an amount of time since they were previously detected in a sequence of images. The target module 134 can maintain a target object profile for each target object, similar to the tracked object profiles for the tracked objects.

The tracking module 130 can provide tracked object data 132 to the target module 134. The tracked object data 132 can include the tracked object identifier for each of one or more tracked objects detected in an image. In this example, the target module 134 can obtain one or more images that include the tracked object from the data storage unit 146. In another example, the tracked object data 132 can include the one or more images that include the tracked object.

The target module 134 can interact with the attribute matching module 140 in a similar manner as the tracking module 130 to obtain overall similarity scores for the detected object(s) and the target objects for use in determining whether the detected object(s) are the same as a target object. If so, the target module 134 can generate an alert. For example, the target module 134 can generate an audible alert, a visual alert on a display that is presenting the video, or a message, e.g., text message or e-mail message, and send the message the message to a user.

A tracking application 162 executing on a user device 160 can present data related to tracked objects and/or target objects. For example, the tracking application 162 can present a video in which objects are being tracked or for which objects were previously tracked. The tracking application 162 can present bounding boxes or other indicators in the video and around or adjacent to each tracked object. The bounding box for a particular tracked object can follow the tracked object from frame to frame. The bounding box for each tacked object can be presented differently, e.g., using different colors or line patterns.

The tracking application 162 can also enable users to query tracked objects and/or target objects. For example, a user can query the data storage unit 146 for particular types of objects, based on tracked object identifiers, target object identifiers, and/or other criteria. The object tracking system 120 can provide data about matching objects, e.g., attribute data and/or other data in a profile for the object.

As the tracking module 130 receives the detected objects data 128 for each object from an object detector 126 and tracks objects based on the received data and based on interactions with the attribute matching module 140, the tracking module 130 is flexible to work with many different types of object detectors. For example, the object tracking system 120 may not have a video decoder 122 or an object detector 126 in some implementations. In such an implementation, the object tracking system 120 can receive the detected objects data 128 for each detected object and each image in the sequence of images, e.g., from a third party object detection system, and track objects in the images, e.g., for the third party object detection system.

In another example, the object tracking system 120 can easily be reconfigured for other use cases by swapping the object detector 126 based on the use case. For example, an object detector adapted to detecting people can be used in a security monitoring system and an object detector adapted to detecting cars can be used in a traffic monitoring system.

The object tracking system 120 can be used to track the trajectory and bearing of objects based on their movement from frame to frame. This can then be used to detect events, such as loitering, abandoned objects, abnormal behaviors, object counting, footfall tracking, direction filtering, and for directional alerts. The object tracking system 120 can also group unique detected objects from different frames together, which can reduce noise in searches by returning a single object seen in multiple frames rather than multiple results for the same object in multiple frames.

Figure 2:
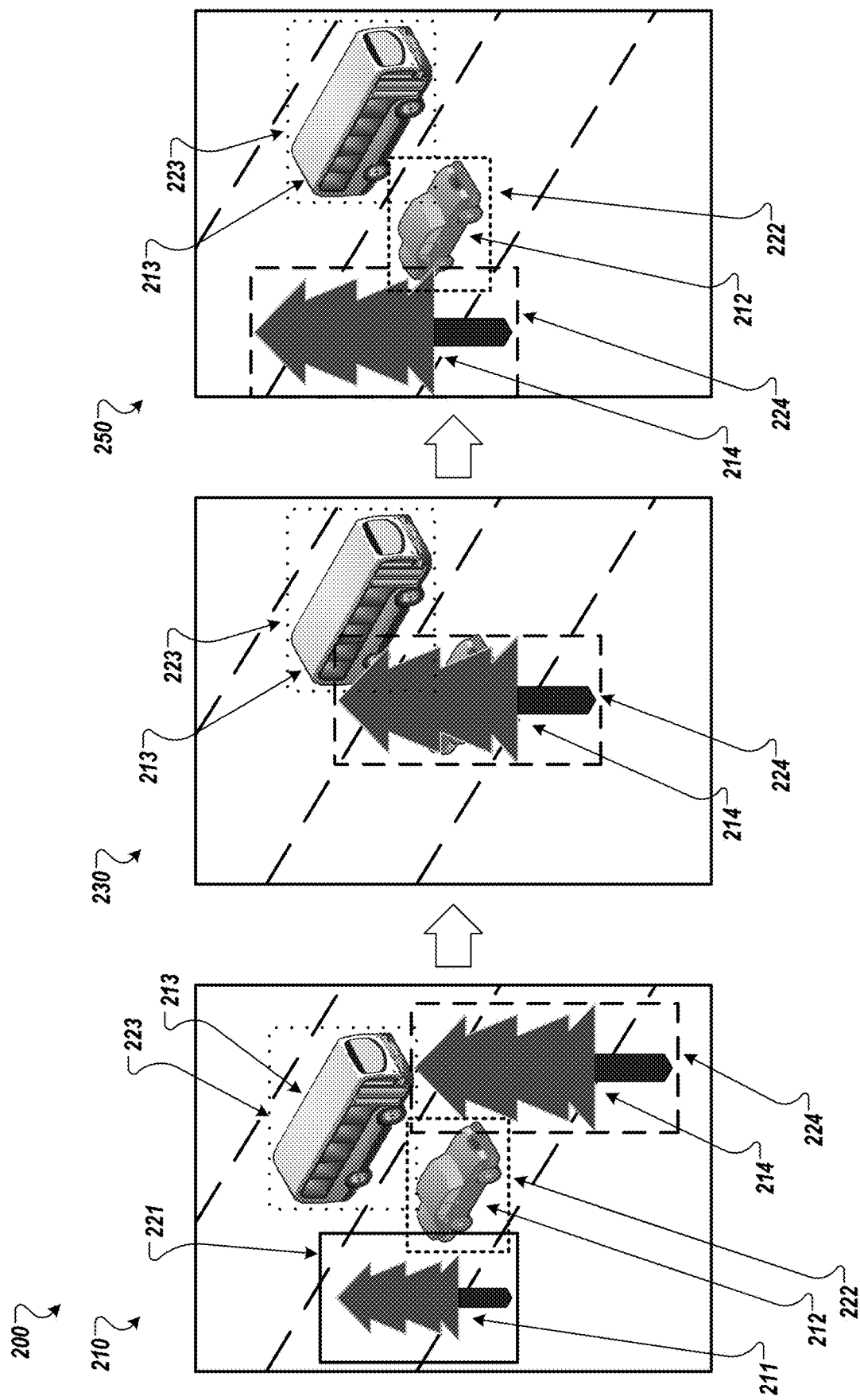
FIG. 2 depicts a sequence of images in which objects are tracked.

FIG. 2 depicts a sequence 200 of images 210, 230, and 250 in which objects are tracked. For example, an object tracking system, such as the object tracking system 120 of FIG. 1, can track the objects over the sequence of images. In the image 210, the object tracking system has detected two trees 211 and 214, a car 212, and a bus 213. The object tracking system has also placed a respective bounding box around each detected object. For example, the object tracking system has placed a bounding box 221 around the tree 211, a bounding box 224 around the tree 214, a bounding box 222 around the car 212, and a bounding box 223 around the bus 213.

If the image is the first image in the sequence, the object tracking system can generate a tracked object profile for each detected object. As described above, the tracked object profile for a tracked object can include a tracked object identifier for the tracked object and attributes, e.g., visual attributes, of the tracked object. For example, the tracked object profile for the tree 211 can include a color profile that includes the colors green and brown.

When the object tracking system receives the next image 230 in the sequence, the object tracking system can detect objects in the image 230 and determine whether any of the objects in the image 230 are the same object as an object in a previous image, e.g., the previous image 210. As described above, the object tracking system can determine whether two objects are the same object based on the attributes of the objects, such as their color profiles, their physical sizes, and their locations in the images.

In this example, the object tracking system has detected a tree and a bus and determined that the tree is the same tree as the tree 214 in the image 210 and that the bus is the same bus as the bus 213 in the image 210. Thus, the object tracking system has placed the same bounding boxes 224 and 223 around the tree 214 and the bus 213, respectively, to designate that the objects are the same in the two images 210 and 230. In the image 230, the tree 211 is no longer in view and the car is hidden behind the tree 214.

When the object tracking system receives the next image 250 in the sequence, the object tracking system can detect objects in the image 250 and determine whether any of the objects in the image 250 are the same object as an object in a previous image, e.g., the previous image 230 and/or the previous image 210. In this example, the object tracking system has detected a tree, a car, and a bus, and determined that the tree is the same tree as the tree 214 in the images 210 and 230 and that the bus is the same bus as the bus 213 in the images 210 and 230.

The object tracking system has also determined that the car is the same car as the car 212 in the image 210. The object tracking system can do this by considering the visual attributes of the car. If the object tracking system only used bounding box data from the previous image 230, the object tracking system would have determined that the car in the image 250 was a newly detected object. By using the attributes of the car in the image 250 and the attributes of the car 212 in the image 210, the object tracking system can determine that both cars are the same car even though the car was 212 was obscured by the tree 214 in the image 230. The object tracking system can also place the same bounding box 222 around the car 212 in the image 250. The object tracking system can also assign the tracked object identifier for the car 212 in the image 210 to the car in the image 250.

Figure 3:
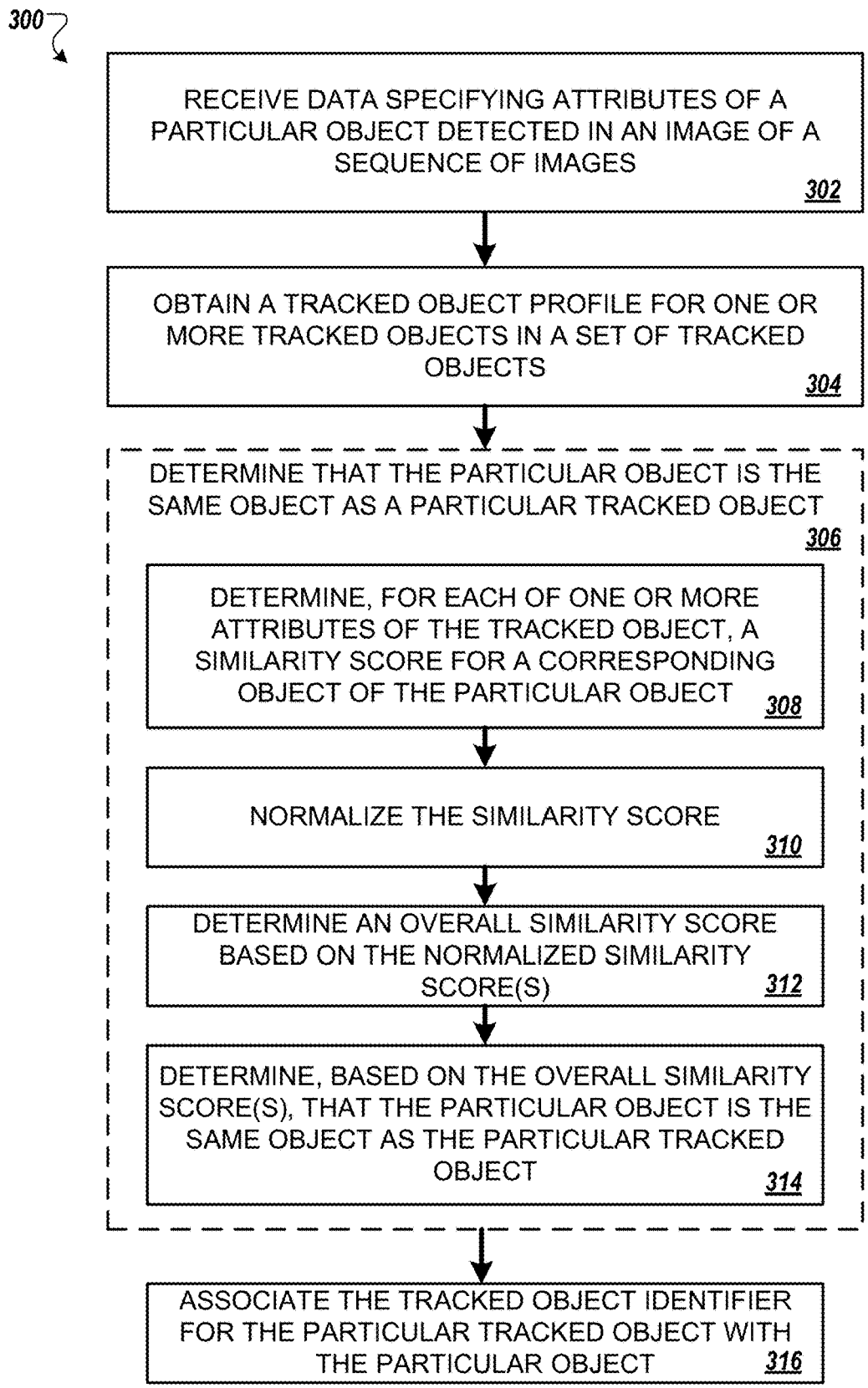
FIG. 3 is a flow diagram of an example process for tracking objects over a sequence of images.

FIG. 3 is a flow diagram of an example process 300 for tracking objects over a sequence of images. The process 300 can be implemented by one or more computer programs installed on one or more computing systems in one or more locations. The process 300 will be described as being performed by an appropriately programed system of one or more computers, e.g., the object tracking system 120 of FIG. 1.

The process 300 can be performed to determine whether an object detected in an image is the same object as a tracked object. The process 300 can be performed for one or more objects detected in the image. For example, the process 300 can be performed separately, e.g., in series or parallel, for all of the detected objects in the image.

The system receives data specifying attributes of a particular object detected in the image (302). The image can be part of a sequence of images. For example, the image can be a frame of a video. The attributes of the particular object can include, for example, the location of the particular object in the image, the color(s) of the particular object, patterns of the particular object, text content of the particular object, the physical size of the particular object, and/or other visual attributes as described above. The attributes of the particular object can be extracted from the image by one or more attributes modules.

The system obtains a tracked object profile for one or more tracked objects previously detected in the sequence of images (304). As described above, the tracked object profile for a tracked object can include a tracked object identifier that uniquely identifies the tracked object and attributes of the tracked object. The attributes can be visual attributes and/or other attributes extracted from a previous image in the sequence of images.

A tracked object profile can be obtained for each tracked object in a cache of recently tracked objects. For example, the cache can include a tracked object profile for objects detected in at least one image of the sequence of images within a maximum number of frames before the current frame of the video or within a maximum duration of time prior to the current frame being received. Tracked object profiles for objects that have not been detected within the maximum number of frames or maximum duration of time can be removed from the cache.

In some implementations, tracked object profiles are obtained for fewer than all of the objects in the cache of tracked objects. For example, if the class of the detected object is known, only tracked object profiles for tracked objects of the same class may be obtained.

The system determines that the particular object is the same object as a particular tracked object (306). In general, the determination can be made based on a comparison of the attributes of the particular detected object and attributes of the particular tracked object specified by the obtained tracked object profile for the particular tracked object and optionally the attributes of one or more other tracked objects. The system can make the determination by performing constituent operations 308-314. The system can perform the operations 308-314 for each of the one or more tracked objects, including the particular tracked object. For example, the system can perform the operations 308-314 for each tracked object in series or in parallel.

The system determines, for each of one or more attributes of the tracked object, a similarity score that represents a measure of similarity between the attribute of the tracked object and a corresponding attribute of the particular object (308). As described above, a set of attribute modules can determine the similarity scores. Each attribute module can be configured to determine the similarity between attributes of a particular type.

The system normalizes one or more of the similarity scores (310). The system can use one or more normalization functions to normalize the similarity score(s). Each normalization function can receive, as input, a similarity score and output a normalized similarity score. The normalized similarity scores can be within a range of scores. For example, the normalized similarity scores for a normalization function can be between −5 and 5, inclusive. In this way, the normalized similarity scores for multiple attributes can be combined, e.g., added together, to determine an overall similarity score.

In some implementations, the system uses a different normalization function for each attribute or each type of attribute, or for at least some of the attributes. As described above, the normalization function for an attribute can be based on the distinctiveness of the attribute. The different normalization functions can have different output ranges, e.g., based on the distinctiveness. For example, an attribute that is more distinctive can be better for determining whether two objects are the same. The normalization function for such an attribute may have a wider range of output scores than the normalization function for other less distinctive attributes to give the attribute more weight in determining the overall similarity score.

The system determines an overall similarity score for the tracked object and the particular object based on the normalized similarity score(s) (312). The overall similarity score for the tracked object and the particular object represents a measure of similarity between the tracked object and the particular object. In some implementations, the system determines the overall similarity score by combining the normalized similarity score for each attribute for which a normalized similarity score was determined for the particular object and the tracked object. For example, the overall similarity score for the tracked object and the particular object can be equal to, or based on, a sum of the normalized similarity scores. In another example, the overall similarity score can be based on a sum of the normalized similarity scores and a baseline score. The baseline score can be equal to, or based on, an a-priori probability that the particular object is the same object as any given tracked object before anything else is known about either the particular object or the tracked object.

The system determines, based on the overall similarity score for a particular tracked object and the particular object, that the particular object is the same as a particular tracked object (314). In some implementations, the system compares the overall similarity score to a threshold similarity score. If the overall similarity score meets or exceeds the threshold, the system can determine that the particular object is the same object as the particular tracked object. If not, the system can determine that the particular object is not the same object as the particular tracked object.

If an overall similarity score is determined for multiple tracked objects with respect to the particular object, the system can compare the overall similarity score for the tracked object that has the highest overall similarity score for the particular object to the threshold similarity score. If that overall similarity score does not meet or exceed the threshold similarity score, the system can determine that the particular object is not the same as any of the tracked objects. For example, the particular object can be a new object that just appeared in the current frame of a video. If the highest overall similarity score meets or exceeds the threshold similarity score, the system can determine that the particular object is the same object as the tracked object that has the highest overall similarity score.

The system associates the particular tracked object identifier for the particular tracked object with the image (316). For example, the system can store data specifying that the particular object in the image is the particular tracked object identified by the tracked object identifier. In a particular example, the system can store the tracked object identifier in the image frame data for the image. In this way, when the image is presented, e.g., during playback of a video from which the image was decoded, the bounding box for the particular tracked object identified by the tracked object identifier can be presented around the particular object. If the particular tracked object is depicted in multiple frames of the video, the bounding box can follow, and surround the image, in each of the multiple frames.

Figure 4:
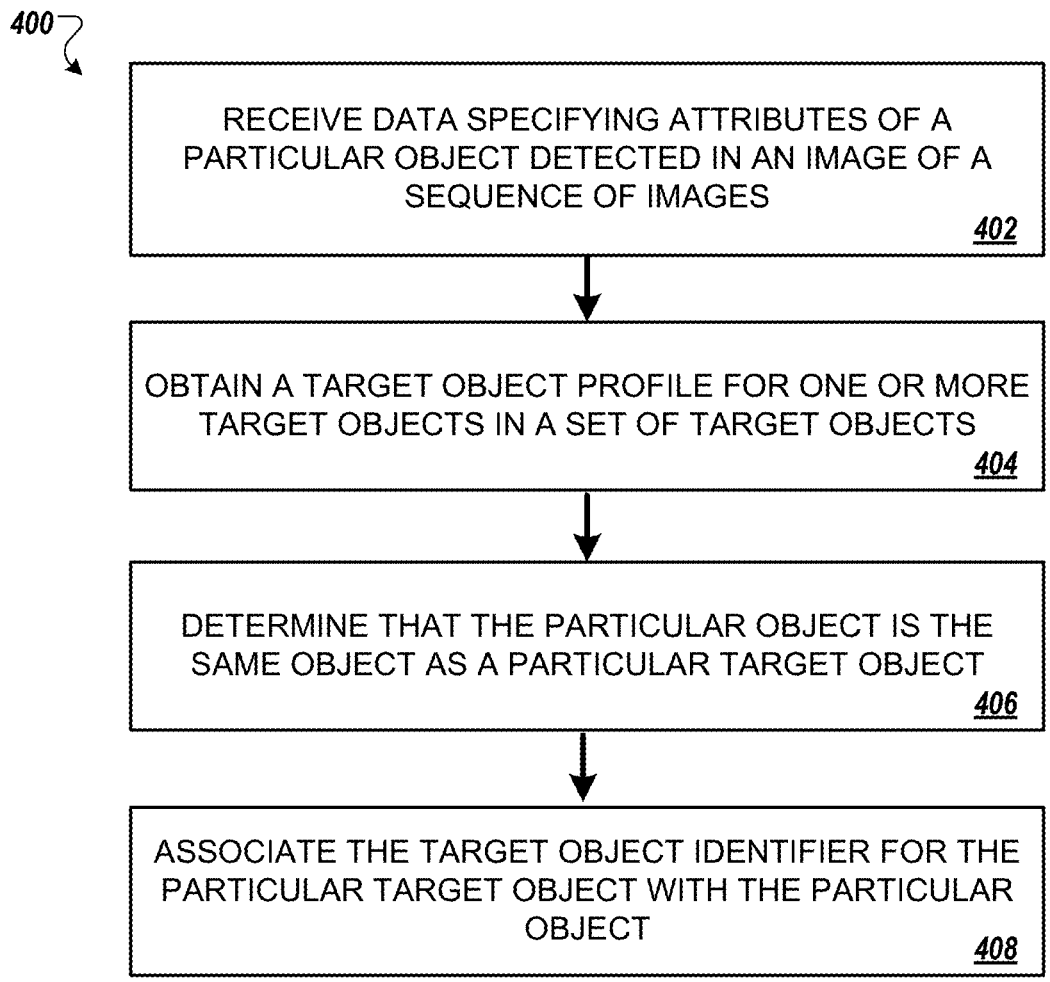
FIG. 4 is a flow diagram of an example process for identifying and tracking target objects over a sequence of images.

FIG. 4 is a flow diagram of an example process 400 for identifying and tracking target objects over a sequence of images. Operations of the process 400 can be performed, for example, by one or more data processing apparatus, such as the object tracking system 120 of FIG. 1. Operations of the process 400 can also be implemented as instructions stored on a non-transitory computer readable medium. Execution of the instructions cause one or more data processing apparatus to perform operations of the process 400.

The process 400 is similar to the process 300 of FIG. 3, but is performed to determine whether an object detected in an image is the same object as a target object. As described above, target objects are objects of interest, e.g., people of interest. The process 400 can be performed for one or more objects detected in the image. For example, the process 400 can be performed separately, e.g., in series or parallel, for all of the detected objects in the image.

The system receives data specifying attributes of a particular object detected in the image (402). The image can be part of a sequence of images. For example, the image can be a frame of a video. The attributes of the particular object can include, for example, the location of the particular object in the image, the color(s) of the particular object, patterns of the particular object, text content of the particular object, the physical size of the particular object, and/or other visual attributes as described above. The attributes of the particular object can be extracted from the image by one or more attributes modules.

The system obtains a target object profile for one or more target objects in a set, e.g., log, of target objects (404). The target object profile for a target object can be the same or similar to the tracked object profile for tracked objects. For example, the target object profile for a target object can include a target object identifier that uniquely identifies the target object and attributes of the target object. The attributes can be visual attributes and/or other attributes, e.g., extracted from one or more images of the target object.

A tracked object profile can be obtained for each tracked object in a cache of recently tracked objects. For example, the cache can include a tracked object profile for objects detected in at least one image of the sequence of images within a maximum number of frames before the current frame of the video or within a maximum duration of time prior to the current frame being received. Tracked object profiles for objects that have not been detected within the maximum number of frames or maximum duration of time can be removed from the cache.

The system determines that the particular object is the same object as a particular target object (406). In general, the determination can be made based on a comparison of the attributes of the particular object and attributes of the particular target object specified by the obtained target object profile for the particular target object and optionally the attributes of one or more other tracked objects. The system can make the determination using operations that are the same as, or similar to, the operations 308-314 of FIG. 3 using the attributes of the particular object and the attributes of the particular target object.

The system associates the particular target object identifier for the particular target object with the image (408). For example, the system can store data specifying that the particular object in the image is the particular target object identified by the target object identifier. In a particular example, the system can store the target object identifier in the image frame data for the image. In this way, when the image is presented, e.g., during playback of a video from which the image was decoded, the bounding box for the particular target object identified by the target object identifier can be presented around the particular object.

In some implementations, the system can also generate an alert in response to determining that an object depicted in an image is the same as a target object. For example, the system can generate an audible alert, a visual alert on a display that is presenting the video, or a message, e.g., text message or e-mail message, and send the message the message to a user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificiallygenerated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 5:
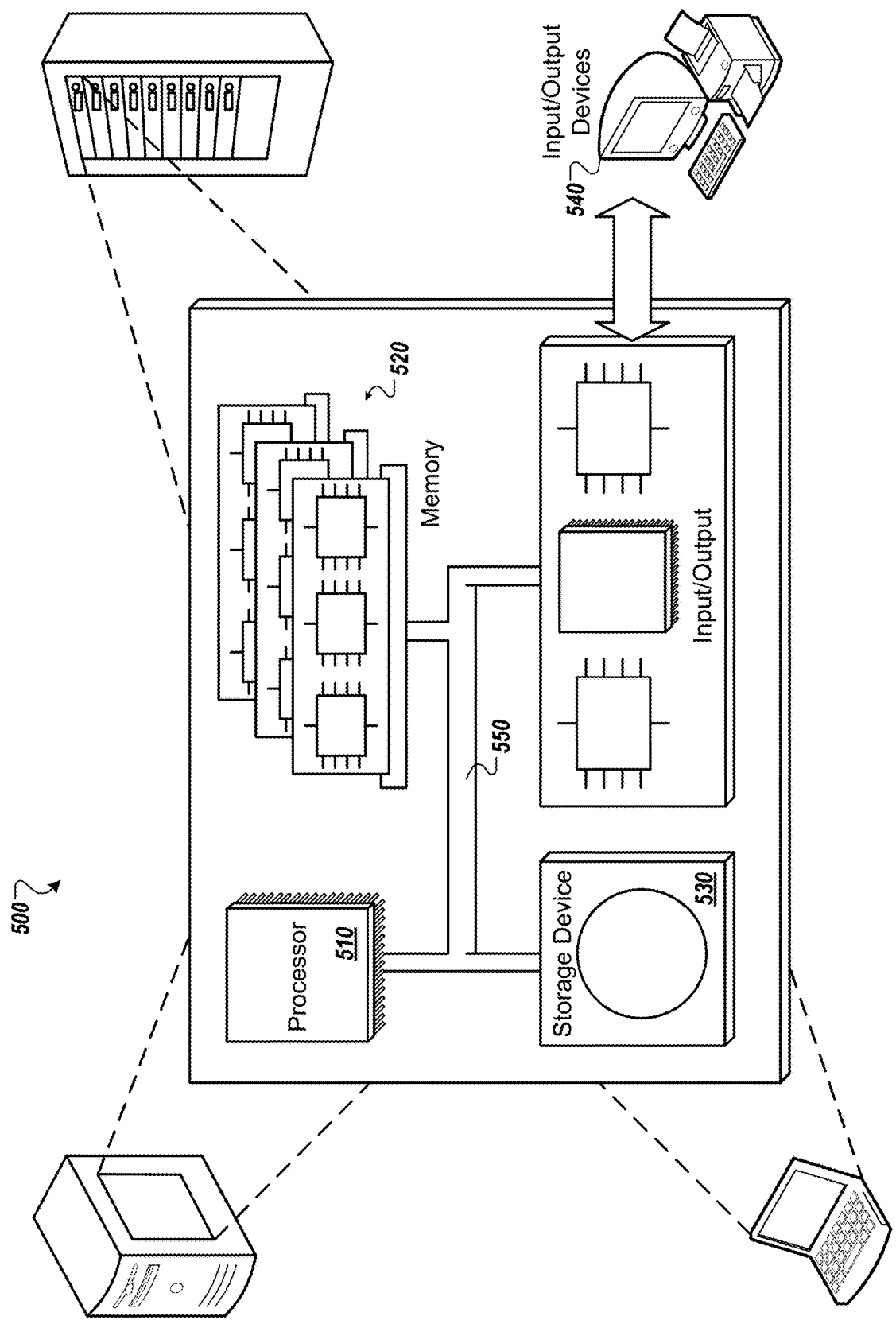
FIG. 5 is a block diagram of a computing system that can be used in connection with computer-implemented methods described in this document.

An example of one such type of computer is shown in FIG. 5, which shows a schematic diagram of a generic computer system 500. The system can be used for the operations described in association with any of the computer-implemented methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
receiving, by a computing system, data specifying visual attributes of a particular object detected in an image of a sequence of images;
obtaining, by the computing system, a tracked object profile for each tracked object in a set of tracked objects that have been previously detected in the sequence of images, the tracked object profile for each tracked object specifying (i) visual attributes of the tracked object and (ii) a tracked object identifier for the tracked object;
determining, by the computing system, that the particular object that was detected in the image is a same object as a particular tracked object in the set of tracked objects that was previously detected in the sequence of images, the determining comprising:
for one or more tracked objects in the set of tracked objects:
determining, for each of one or more visual attributes of the tracked object specified by the tracked object profile for the tracked object, a similarity score that represents a measure of similarity between the visual attribute of the tracked object and a corresponding visual attribute of the particular object;
normalizing the similarity score for each of the one or more visual attributes of the tracked object using a normalization function for the visual attribute, wherein the normalization function for at least one visual attribute is different from the normalization function for at least one different visual attribute;
determining an overall similarity score for the tracked object based on each normalized similarity score for each of the one or more visual attributes of the tracked object, the overall similarity score representing an overall measure of visual similarity between the tracked object and the particular object;
determining, based on the overall similarity score for each of the one or more tracked objects including the particular tracked object, that the particular object is the same object as the particular tracked object; and
in response to determining that the particular object is the same object as the particular tracked object;
associating the tracked object identifier for the particular tracked object with the particular object in the image of the sequence of images; and
updating the tracked object profile for the particular tracked object, the updating including updating the visual attributes of the particular tracked object based on the visual attributes of the particular object.

2. The method of claim 1, wherein associating the tracked object identifier for the particular tracked object with the particular object in the image of the sequence of images comprises storing, with the image, data specifying the tracked object identifier and a location of the particular object in the image.

3. The method of claim 1, wherein determining the overall similarity score for the tracked object based on the combination of the normalized similarity score for each visual attribute of the tracked object comprises determining a sum of a baseline score and the normalized similarity score for each visual attribute of the tracked object.

4. The method of claim 3, wherein the baseline score is based on a number of objects detected in the image.

5. The method of claim 1, wherein determining, for each visual attribute of the tracked object specified by the tracked object profile for the tracked object, the similarity score that represents a measure of similarity between the visual attribute of the tracked object and the corresponding visual attribute of the particular object comprises:
for each visual attribute of the tracked object:

providing the visual attribute of the tracked object and the corresponding visual attribute of the particular object as input to a dedicated attribute model for a type of attribute of the visual attribute of the tracked object, wherein the attribute model for each type of attribute is different from the attribute model for each other type of attribute; and receiving, as an output of the dedicated attribute model, the similarity score that represents the measure of similarity between the visual attribute of the tracked object and the corresponding visual attribute of the particular object.

6. The method of claim 1, wherein:

the one or more visual attributes of the tracked object include multiple visual attributes; and determining an overall similarity score for the tracked object based on each normalized similarity score for each of the one or more visual attributes of the tracked object comprises determining, as the overall similarity score, a combination of the normalized similarity scores for the multiple visual attributes.

7. The method of claim 1, wherein the normalization function for each visual attribute is based on an assigned distinctiveness of the visual attribute.

8. The method of claim 1, wherein:

each normalization function for each visual attribute specifies a range of values for the normalized similarity score determined using the normalization function;

the range of values of one or more of the normalization functions includes a negative subrange that include one or more negative values and a positive subrange that includes one or more positive values; and each subrange is based on a first measure of likelihood that two objects for which the visual attribute matches are a same object and a second measure of likelihood that two objects for which the visual attribute does not match are not the same object.

9. The method of claim 1, wherein the sequence of images is part of a video, the method further comprising determining that a given tracked object in the set of tracked objects has not been detected in at least a threshold duration of the video since a last image in which the given tracked object was detected and, in response, removing the given tracked object from the set of tracked objects.

10. The method of claim 1, wherein:

the sequence of images includes images captured by multiple cameras;

the visual attributes of the particular object include an attribute specifying a camera of the multiple cameras that captured the image; and the tracked object profile for each tracked object comprises data specifying one or more cameras that captured an image in which the tracked object was detected and, for each camera, one or more times the tracked object was detected in an image captured by the camera.

11. The method of claim 1, wherein updating the visual attributes of the particular tracked object based on the visual attributes of the particular object comprises determining a combined visual attribute for at least one visual attribute of the particular tracked object by combining the visual attribute of the particular tracked object with the corresponding visual attribute of the particular object.

12. A computer-implemented method, comprising:

receiving, by a computing system, data specifying visual attributes of a particular object detected in an image;

identifying, by the computing system, a tracked object profile for a tracked object, the tracked object profile comprising data specifying visual attributes of the tracked object;

determining a level of similarity between the particular object detected in the image and the tracked object based on comparison of visual attributes of the particular object with corresponding visual attributes of the tracked object, including normalizing similarities for the compared visual attributes, wherein a first normalization function used to normalize a level of similarity between first corresponding visual attributes of the particular object and the tracked object is different from a second normalization function used to normalize a level of similarity between second corresponding visual attributes of the particular object and the tracked object;

determining, based on the level of similarity between the particular object detected in the image and the tracked object, that the particular object matches the tracked object;

providing an indication that the particular object matches the tracked object; and updating the tracked object profile for the tracked object in response to determining that the particular object matches the tracked object, the updating including updating the visual attributes of the tracked object based on the visual attributes of the particular object.

13. The method of claim 12, wherein determining a level of similarity between the particular object detected in the image and the tracked object comprises determining, as the level of similarity, a combination of the normalized similarities for the visual attributes.

14. The method of claim 12, wherein the first normalization function is based on an assigned distinctiveness of the first corresponding visual attributes and the second normalization function is based on an assigned distinctiveness of the second corresponding visual attributes.

15. The method of claim 12, wherein:

each normalization function for each visual attribute specifies a range of values for a normalized similarity determined using the normalization function;

the range of values of one or more of the normalization functions includes a negative subrange that include one or more negative values and a positive subrange that includes one or more positive values; and each subrange is based on a first measure of likelihood that two objects for which the visual attribute matches are a same object and a second measure of likelihood that two objects for which the visual attribute does not match are not the same object.

16. A computer program product, encoded on one or more non-transitory computer storage media, comprising instructions that when executed by one or more computers cause the one or more computers to perform operations comprising:

receiving data specifying visual attributes of a particular object detected in an image;

identifying a tracked object profile for a tracked object, the tracked object profile comprising data specifying visual attributes of the tracked object;

determining a level of similarity between the particular object detected in the image and the tracked object based on comparison of visual attributes of the particular object with corresponding visual attributes of the tracked object, including normalizing similarities for the compared visual attributes, wherein a first normalization function used to normalize a level of similarity between first corresponding visual attributes of the particular object and the tracked object is different from a second normalization function used to normalize a level of similarity between second corresponding visual attributes of the particular object and the tracked object;

determining, based on the level of similarity between the particular object detected in the image and the tracked object, that the particular object matches the tracked object;

providing an indication that the particular object matches the tracked object; and updating the tracked object profile for the tracked object in response to determining that the particular object matches the tracked object, the updating including updating the visual attributes of the tracked object based on the visual attributes of the particular object.

17. The computer program product of claim 16, wherein determining a level of similarity between the particular object detected in the image and the tracked object comprises determining, as the level of similarity, a combination of the normalized similarities for the visual attributes.

18. The computer program product of claim 16, wherein the first normalization function is based on an assigned distinctiveness of the first corresponding visual attributes and the second normalization function is based on an assigned distinctiveness of the second corresponding visual attributes.

19. The computer program product of claim 16, wherein:
each normalization function for each visual attribute specifies a range of values for a normalized similarity determined using the normalization function;
the range of values of one or more of the normalization functions includes a negative subrange that include one or more negative values and a positive subrange that includes one or more positive values; and
each subrange is based on a first measure of likelihood that two objects for which the visual attribute matches are a same object and a second measure of likelihood that two objects for which the visual attribute does not match are not the same object.

20. The method of claim 12, wherein updating the visual attributes of the tracked object based on the visual attributes of the particular object comprises determining a combined visual attribute for at least one visual attribute of the tracked object by combining the visual attribute of the tracked object with the corresponding visual attribute of the particular object.

* * * * *

UNITED STATES PATENT AND TRADEMARK OFFICE
CERTIFICATE OF CORRECTION

PATENT NO. : 10,872,424 B2
APPLICATION NO. : 16/195285
DATED : December 22, 2020
INVENTOR(S) : Philippe Daniel and Anders Astrom It is certified that error appears in the above-identified patent and that said Letters Patent is hereby corrected as shown below:

In the Claims

In Claim 1, Column 22, Line 39, delete "object;" and insert -- object: --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*